(12) United States Patent
Kimbara et al.

(10) Patent No.: US 8,406,947 B2
(45) Date of Patent: Mar. 26, 2013

(54) VEHICLE BODY SPEED CALCULATION DEVICE

(75) Inventors: Masato Kimbara, Anjo (JP); Masahiro Matsuura, Chiryu (JP); Shinya Kodama, Susono (JP)

(73) Assignee: Toyota Jidosha Kabushiki Kaisha, Toyota-shi (JP)

(*) Notice: Subject to any disclaimer, the term of this patent is extended or adjusted under 35 U.S.C. 154(b) by 400 days.

(21) Appl. No.: 12/676,743

(22) PCT Filed: Jan. 16, 2009

(86) PCT No.: PCT/JP2009/050563
§ 371 (c)(1),
(2), (4) Date: Mar. 5, 2010

(87) PCT Pub. No.: WO2009/093531
PCT Pub. Date: Jul. 30, 2009

(65) Prior Publication Data
US 2010/0256847 A1   Oct. 7, 2010

(30) Foreign Application Priority Data
Jan. 22, 2008   (JP) ................................. 2008-011888

(51) Int. Cl.
*G06F 19/00* (2011.01)
(52) U.S. Cl. ........... 701/22; 702/142; 702/145; 702/148
(58) Field of Classification Search .................... 701/22; 702/142, 145, 148
See application file for complete search history.

(56) References Cited

U.S. PATENT DOCUMENTS

| | | | |
|---|---|---|---|
| 5,371,688 A * | 12/1994 | Fujioka | 702/148 |
| 6,122,586 A * | 9/2000 | Shimizu | 701/74 |
| 6,283,239 B1 | 9/2001 | Tsukamoto et al. | |
| 6,438,506 B1 | 8/2002 | Yohpe et al. | |
| 6,898,506 B2 * | 5/2005 | Kawai et al. | 701/84 |

(Continued)

FOREIGN PATENT DOCUMENTS

| | | |
|---|---|---|
| DE | 198 59 227 A1 | 7/1999 |
| JP | 8 268252 | 10/1996 |

(Continued)

OTHER PUBLICATIONS

Office Action issued Dec. 5, 2011, in German Patent Application No. 11 2009 000 379.6 (with English-language translation).

*Primary Examiner* — Ruth Ilan
*Assistant Examiner* — James English
(74) *Attorney, Agent, or Firm* — Oblon, Spivak, McClelland, Maier & Neustadt, L.L.P.

(57) ABSTRACT

A vehicle body speed calculation device includes a wheel speed derivation mechanism deriving wheel speeds based on detection signals from wheel speed sensors which detect the speeds of wheels of a vehicle; a rotational speed derivation mechanism deriving a rotational speed based on a detection signal from a rotational speed detection sensor which detects the rotational speed of an energy conversion device, the energy conversion device being connected to the wheels and being capable of mutual conversion between electric energy and rotational energy; and a body speed calculation mechanism calculating a body speed by using the rotational speed of the energy conversion device derived by the rotational speed derivation mechanism when the vehicle is travelling in a predetermined low speed range but for calculating the body speed by using the wheel speeds derived by the wheel speed derivation mechanism when the vehicle is travelling in a predetermined high speed range.

6 Claims, 7 Drawing Sheets

U.S. PATENT DOCUMENTS

| | | |
|---|---|---|
| 7,110,869 B2 * | 9/2006 | Tao et al. ............... 701/31.1 |
| 7,174,241 B2 * | 2/2007 | Tsuruhara et al. ............ 701/1 |
| 7,962,310 B2 * | 6/2011 | Guegan et al. ............ 702/142 |
| 7,970,525 B2 * | 6/2011 | Laiou et al. ............... 701/93 |
| 8,140,207 B2 * | 3/2012 | Nozaki et al. ............. 701/22 |
| 2002/0013674 A1 | 1/2002 | Sugiyama et al. |
| 2004/0249524 A1 * | 12/2004 | Ozeki et al. ............... 701/22 |
| 2005/0080527 A1 | 4/2005 | Tao et al. |
| 2005/0246087 A1 | 11/2005 | Hommi et al. |
| 2010/0262322 A1 * | 10/2010 | Yokouchi et al. ........... 701/22 |
| 2010/0274421 A1 * | 10/2010 | Falkenstein ............... 701/22 |

FOREIGN PATENT DOCUMENTS

| | | |
|---|---|---|
| JP | 11 289610 | 10/1999 |
| JP | 2000 221207 | 8/2000 |
| JP | 2004 90695 | 3/2004 |

* cited by examiner

VEHICLE BODY SPEED CALCULATION DEVICE

TECHNOLOGICAL FIELD

The present invention relates to a vehicle body speed calculation device.

BACKGROUND ART

Heretofore, as vehicle body speed calculation devices, there has been known one which is shown in Patent Document 1. As shown in FIGS. 1 to 5 of Patent Document 1, in the vehicle body speed calculation device, vehicle speed pulses are generated based on wheel speed signals which are taken into an ABS control microcomputer 2 through an interface circuit 3, and the vehicle speed pulses are outputted to an interface circuit 31 of a speedometer 30 after being converted by, for example, a vehicle speed converter circuit 7 built in an ABS controller 1 into a vehicle speed signal of alternating current. That is, a body speed for use in controlling the vehicle and display on the speedometer is calculated by using the detection signals of wheel speed sensors.
Patent Document 1: JP 08-268252 A

DISCLOSURE OF THE INVENTION

Problem to be Solved by the Invention

In the vehicle body speed calculation device described in the aforementioned Patent Document 1, when the vehicle is travelling in a low speed range, the wheel speed sensors generally have a smaller number of pulses inputted thereto and deteriorate in detection accuracy, so that a body speed calculated based on the detection signals deteriorates in accuracy.

Furthermore, vehicles (e.g., hybrid cars and electric cars) that are equipped with motors as driving sources are increasing in recent years. In the vehicle of this type, a body speed is calculated by using detection signals which are given from a resolver incorporated in, for example, a motor in dependence on the rotational speed of the motor. In this instance, when the vehicle is travelling in a high speed range, the resolver deteriorates in detection accuracy because the frequency of the detection signals generally becomes high to come close to an exciting frequency being a fixed value, so that a body speed calculated based on the detection signals deteriorates in accuracy.

The present invention has been made to solve the foregoing problems, and an object thereof is to calculate a body speed precisely over all speed ranges in a vehicle body speed calculation device.

Measures for Solving the Problems

In order to solve the aforementioned problems, a structural feature of the invention resides in comprising wheel speed derivation means for deriving wheel speeds based on detection signals from wheel speed sensors which detect the speeds of wheels of a vehicle; rotational speed derivation means for deriving a rotational speed based on a detection signal from a rotational speed detection sensor which detects the rotational speed of an energy conversion device, the energy conversion device being connected to the wheels and being capable of mutual conversion between electric energy and rotational energy; and body speed calculation means for calculating a body speed by using the rotational speed of the energy conversion device derived by the rotational speed derivation means when the vehicle is travelling in a predetermined low speed range but for calculating the body speed by using the wheel speeds derived by the wheel speed derivation means when the vehicle is travelling in a predetermined high speed range which is higher in speed than the predetermined low speed range.

another structural feature of the invention resides in that when the vehicle is travelling in a switching range between the predetermined low speed range and the predetermined high speed range, the body speed calculation means calculates the body speed after weighting a first body speed calculated by using the wheel speeds derived by the wheel speed derivation means and a second body speed calculated by using the rotational speed derived by the rotational speed derivation means.

Another structural feature of the invention resides in that the body speed calculation means in the switching range performs the switching between the first body speed and the second body speed while changing the weightings on the first and second body speeds.

Another structural feature of the invention resides in that the body speed calculation means provides an up/down limiting guard against changing the weightings.

Another structural feature of the invention resides in that the up/down limiting guard is varied in dependence on the speed difference between the first body speed and the second body speed.

Another structural feature of the invention resides in that the body speed calculation means in the switching range calculates a last calculated body speed as a presently calculated body speed when the first and second body speeds are increasing and when the presently calculated body speed is a smaller value than the last calculated body speed and calculates the last calculated body speed as the presently calculated body speed when the first and second body speeds are decreasing and when the presently calculated body speed is a larger value than the last calculated body speed.

Another structural feature of the invention resides in that when either one of a derivation result by the wheel speed derivation means and a derivation result by the rotational speed derivation means is normal, the body speed calculation means calculates the body speed by using the derivation result being normal.

Effects of the Invention

In the invention as constructed above, when the vehicle is travelling in the predetermined low speed range, the body speed calculation means calculates the body speed by using the rotational speed derived by the rotational speed derivation means which derives the rotational speed based on the detection signal from the rotational speed detection sensor which detects the rotational speed of the energy conversion device, the energy conversion device being connected to the wheels and being capable of mutual conversion between electric energy and rotational energy. When the vehicle is travelling in the predetermined high speed range which is higher in speed than the predetermined low speed range, on the other hand, the body speed calculation means calculates the body speed by using the wheel speeds derived by the wheel speed derivation means which derives the wheel speeds based on the detection signals from the wheel speed sensors which detect the speeds of the wheels of the vehicle. Thus, when the vehicle is travelling in each of the predetermined low speed range and the predetermined high speed range, it can be realized to calculate the body speed precisely in each of the both speed ranges.

In the another feature of the invention as constructed above, when the vehicle is travelling in the switching range between the predetermined low speed range and the predetermined high speed range, the body speed calculation means calculates the body speed after weighting the first body speed calculated by using the wheel speeds derived by the wheel speed derivation means and the second body speed calculated by using the rotational speed derived by the rotational speed derivation means. Thus, it can be realized to calculate the body speed precisely and properly even in the switching range, and hence, it can be realized to calculate the body speed over all the speed ranges.

In the another feature of the invention as constructed above, the body speed calculation means in the invention performs the switching between the first body speed and the second body speed after changing the weightings on the first and second body speeds in the switching range. Thus, it can be realized to perform the switching between the first body speed and the second body speed smoothly in the switching range.

In the another feature of the invention as constructed above, the body speed calculation means in the invention provides the up/down limiting guard against changing the weightings. Thus, it can be realized to change the weightings properly.

In the another feature of the invention as constructed above, the up/down limiting guard in the invention is varied in dependence on the speed difference between the first body speed and the second body speed. Thus, it can be realized to change the weightings properly in dependence on the speed difference between the first body speed and the second body speed.

In the another feature of the invention as constructed above, the body speed calculation means in the switching range in the invention calculates the last calculated body speed as the presently calculated body speed when the first and the second body speeds are increasing and when the presently calculated body speed is a smaller value than the last calculated body speed, and calculates the last calculated body speed as the presently calculated body speed when the first and second body speeds are decreasing and when the presently calculated body speed is a larger value than the last calculated body speed. Thus, it can be realized to calculate an appropriate body speed meeting the increase/decrease of the body speed.

In the another feature of the invention as constructed above, either one of the derivation result by the wheel speed derivation means and the derivation result by the rotational speed derivation means is normal, the body speed calculation means calculates the body speed by using the derivation result being normal. Thus, it can be realized to calculate an appropriate body speed based on the calculation result being normal.

DESCRIPTION OF REFERENCE SYMBOLS

11 . . . engine, 12 . . . drive motor (energy conversion device), 12a . . . resolver (rotational speed detection sensor), 13 . . . drive division mechanism, 14 . . . power transmission mechanism, 15 . . . generator (energy conversion device), 16 . . . inverter, 17 . . . battery, 18 . . . engine ECU, 19 . . . hybrid ECU, 19a . . . gas pedal, 19a1 . . . gas pedal opening degree sensor, 21 . . . brake pedal, 21a . . . stroke sensor, 22 . . . vacuum brake booster, 23 . . . master cylinder, 24 . . . reservoir tank, 25 . . . brake actuator (automatic hydraulic pressure generation device), 25a, 25b . . . hydraulic pressure circuits, 26 . . . brake ECU (wheel speed derivation means (steps 106, 108), rotational speed derivation means (steps 112, 114), body speed calculation means (steps 118-122)), 41, 51 . . . differential pressure control valves, 42a, 43a, 52a, 53a . . . pressure increase valves, 42b, 43b, 52b, 53b . . . pressure reducing valves, 44a, 54a . . . pumps, 44b . . . pump motor, 44c, 54c . . . pressure regulation reservoirs, 60 . . . speedometer, A . . . regenerative brake force generation device, B . . . hydraulic brake device, WCfl, WCfr, WCrl, WCrr . . . wheel cylinders, Sfl, Sfr, Srl, Srr . . . wheel speed sensors.

PREFERRED EMBODIMENTS FOR PRACTICING THE INVENTION

Figure 1:
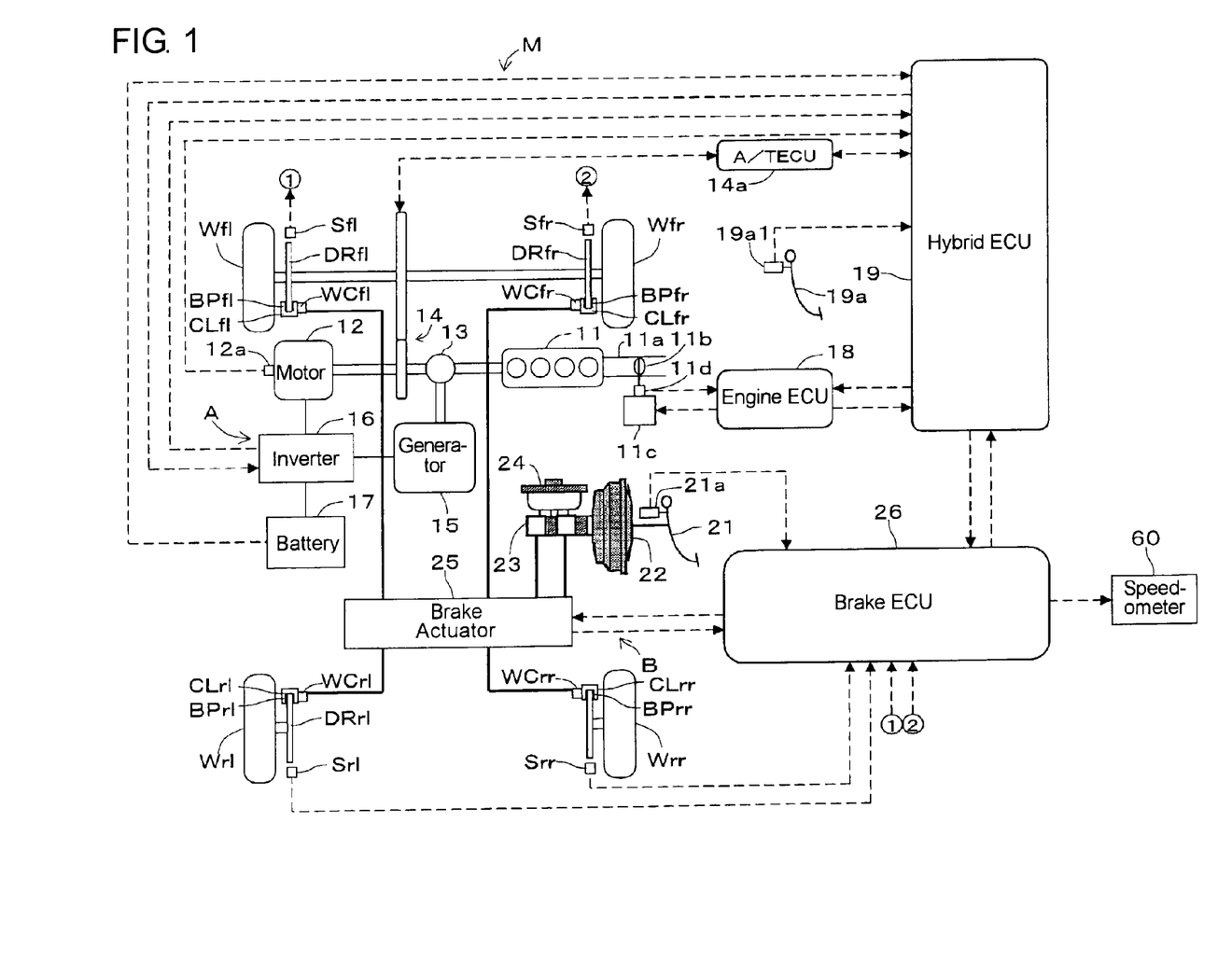
FIG. 1 is a schematic view showing one embodiment of a vehicle to which a vehicle body speed calculation device according to the present invention is applied.
Figure 2:
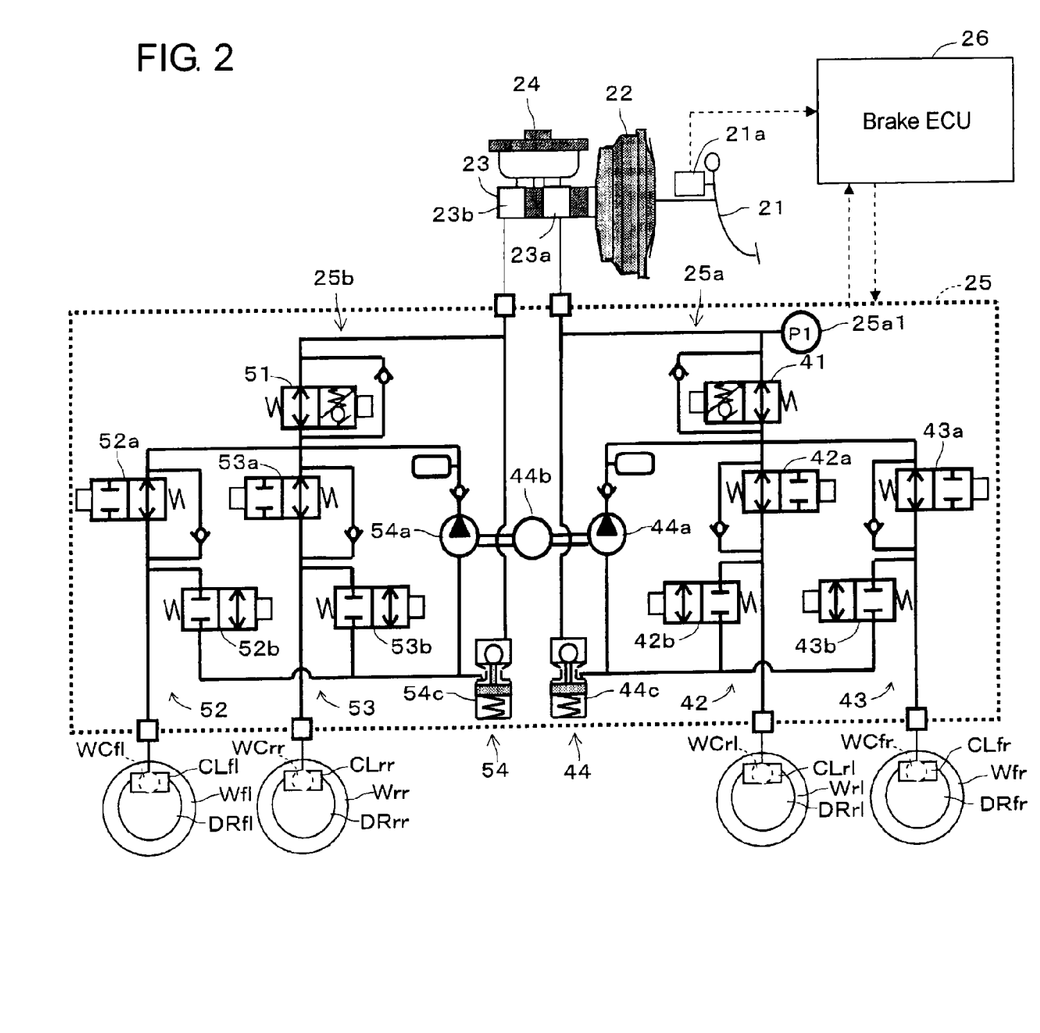
FIG. 2 is a diagram showing oil passages including a brake actuator shown in FIG. 1.

Hereafter, with reference to the drawings, description will be made regarding one embodiment in which a body speed calculation device according to the present invention is applied to a hybrid vehicle. FIG. 1 is a schematic view showing the construction of the hybrid vehicle, and FIG. 2 is a schematic view showing the construction of a hydraulic brake device. As shown in FIG. 1, the hybrid vehicle is a vehicle of the type that a hybrid system drives driving wheels like left and right front wheels Wfl, Wfr for example. The hybrid system is a power train that uses two kinds of power sources comprising an engine 11 and a drive motor 12 in combination. In the case of the present embodiment, it is a parallel hybrid system being of the type that the engine 11 and the drive motor 12 both directly drive the wheels. Besides, there is a serial hybrid system, in which the drive motor 12 drives the wheels while the engine 11 operates as an electricity supply source to the drive motor 12.

Further, the vehicle body speed calculation device according to the present invention is also applicable to an electric car which is driven only by the drive motor 12 without equipping the engine 11. Further, the vehicle body speed calculation device according to the present invention is applicable not to a hybrid vehicle which drive front wheels in cooperation of the engine 11 with the drive motor 12, but also to a four-wheel drive hybrid vehicle in which rear wheels are driven by a drive motor independent of the drive motor 12.

The vehicle M being a hybrid vehicle is provided with the engine 11 and the drive motor 12. The driving power of the engine 11 is transmitted to driving wheels (left and right front wheels Wfl, Wfr in the present embodiment) through a drive division mechanism 13 and a power transmission mechanism 14, while the driving power of the drive motor 12 is transmitted to the driving wheels through the power transmission mechanism 14. The drive division mechanism 13 is for suitably dividing the driving power of the engine 11 to a vehicle driving power and a generator driving power. The power transmission mechanism 14 appropriately integrates the driving powers of the engine 11 and the drive motor 12 in dependence on the travelling condition to transmit the integrated power to the driving wheels. The power transmission mechanism 14 adjusts the ratio of driving powers transmitted from the engine 11 and the drive motor 12 in a range of 0:100 to 100:0. The power transmission mechanism 14 has a gear change function and is controllable by being commanded from an automatic transmission (A/T) ECU (Electronic Control Unit) 14a.

The engine 11 is provided with an intake pipe 11a for making air flow into combustion chambers of the engine 11, and the intake pipe 11a is provided therein with a throttle valve 11b for adjusting the opening amount of the intake pipe 11a thereby to regulate the quantity of air passing through the intake pipe 11a.

The engine 11 is controllable by an engine ECU (Electronic Control Unit) 18, and the engine ECU 18 controls the opening/closing of the throttle valve 11b in accordance with an engine power demand value from a hybrid ECU (Electronic Control Unit) 19 to regulate the rotational speed of the engine 11. Fuel to the engine 11 is automatically supplied to meet the opening/closing amount or the intake air volume of the throttle valve 11b.

That is, the throttle valve 11b is opened or closed by driving a throttle drive motor 11c in response to a command from the engine ECU 18, and the opening/closing amount of the throttle valve 11b is detected by a throttle opening degree sensor 11d whose detection signal is outputted to the engine ECU 18, so that a feedback control is performed to make the opening/closing amount become a command value from the engine ECU 18. The command value from the engine ECU 18 is a value determined based on the engine power demand value from the hybrid ECU 19.

The drive motor 12 is for assisting the output power of the engine 11 and increasing the driving power at the time of acceleration of the vehicle M, but for generating electric power to apply a regenerative brake force on the driving wheels at the time of braking of the vehicle M. The generator 15 is for generating electric power by the power of the engine 11 and has a function as starter at the time of engine start. These drive motor 12 and generator 15 are electrically connected to an inverter 16. The inverter 16 is electrically connected to a battery 17 as direct-current power supply and operates to convert alternating-current voltages inputted from the drive motor 12 and the generator 15 into direct-current voltages to supply the same to the battery 17 and conversely, to convert a direct-current voltage from the battery 17 into an alternating-current voltage to output the same to the drive motor 12 and the generator 15. The aforementioned drive motor 12 and generator 15 are energy conversion devices which are connected to the wheels and which are capable of mutual conversion between electric energy and rotational energy.

The drive motor 12 is provided with a resolver 12a being a rotational speed detection sensor which detects the rotational speed and rotational position (absolute position) of the motor.

The resolver 12a is of the type that is generally well known and is composed of rotor coils rotatable together with a spindle (output spindle) of the motor and a pair of stationary coils secured with the phases shifted 90 degrees. When an alternating-current (e.g., $E \sin 2\pi ft$) as exiting voltage is applied to the rotor coils, alternating-current output voltages are induced on the pair of stationary coils, which respectively output two phase signals (e.g., $K \cdot E \sin 2\pi ft \cdot \cos \theta$ and $K \cdot E \sin 2\pi ft \cdot \sin \theta$) whose amplitudes varies in the form of a sine wave with respect to the rotational angle $\theta$ of the rotor coils (the rotational angle of the spindle of the motor) and whose phases are shifted 90 degrees. Here, E denotes excitation voltage amplitude, f denotes excitation frequency, t denotes time and K denotes transformation ratio. Respective detection signals from the resolver 12a are outputted to a brake ECU 26 through the hybrid ECU 19.

The hybrid ECU 19 may be configured to calculate the rotational angle $\theta$ and the rotational speed $V\omega$ by the use of the respective detection signals inputted thereto and to output those calculation results to the brake ECU 26. Further, the resolver 12a may be configured to have a function of calculating (converting) the respective output signals of the rotor coils into the rotational angle $\theta$ and the rotational speed $V\omega$ and to output the calculation results to the brake ECU 26 through the hybrid ECU 19. Further, the detection signals (resolver signals) of the resolver 12a may be outputted to the brake ECU 26.

The resolver 12a deteriorates the detection accuracy as the rotational speed $V\omega$ of the drive motor 12 increases. The rotational speed $V\omega$ is calculated from the respective detection signals of the resolver 12a, and as the rotational speed $V\omega$ increases, that is, as the frequency of the detection signals becomes high, the frequency comes close to the excitation frequency being a fixed value, so that the detection accuracy deteriorates. As a result, the accuracy of a second body speed V2 which is calculated based on the detection signals of the resolver 12a also deteriorates. On the other hand, wheel speed sensors S** referred to later deteriorate the detection accuracy as the wheel speeds become low. The decrease in number of pulses inputted causes the detection accuracy to deteriorate. As a result, the accuracy of a first body speed V1 which is calculated based on the detection signals from the wheel speed sensors also deteriorates.

Where the vehicle M is travelling at a low speed (e.g., lower than 10 km/h), the accuracy with which the resolver 12a detects the rotational speed $V\omega$ of the drive motor 12 is higher than the accuracy with which the wheel speed sensors Sfl, Sfr, Srl, Srr detect the rotational speeds of the wheels. Where the vehicle M is travelling at a high speed faster than the low speed, on the other hand, the accuracy with which the wheel speed sensors Sfl, Sfr, Srl, Srr detect the rotational speeds of the wheels is higher than the accuracy with which the resolver 12a detects the rotational speed $V\omega$ of the drive motor 12.

In the present embodiment, a regenerative brake force generation device A is constituted by the drive motor 12, the inverter 16 and the battery 17, and the regenerative brake force generation device A is for generating a regenerative brake force which depends on a brake manipulation state detected by brake manipulation state detection means, on specified wheels (the left and right front wheels Wfl, Wfr driven by the drive motor 12 being the power source in the present embodiment) of the respective wheels Wfl, Wfr, Wrl, Wrr.

The brake manipulation state is the manipulation state of a brake pedal 21 and may be taken as, for example, the stroke amount of the brake pedal 21, the stepping force on the brake pedal 21, the master cylinder pressure correlating with the stepping force, or the like. Brake manipulation state detection means is for detecting the brake manipulation state and may be a pedal stroke sensor 21a which detects the stroke amount of the brake pedal 21, a pressure sensor 25a1 which detects the master cylinder pressure, or the like.

The hybrid ECU 19 derives an engine power, an electric motor torque and an generator torque which are required, from a gas pedal opening degree by the gas pedal 19a, which degree is detected by a gas pedal opening degree sensor 19a1 provided by the gas pedal 19a, a shift position (calculated from a shift position signal inputted from a shift position sensor (not shown)) and a body speed VB and outputs an engine power demand value so derived to the engine ECU 18 to control the driving power of the engine 11.

The hybrid ECU 19 is connected to the inverter 16 to be able to communicate with each other. The hybrid ECU 19 controls the drive motor 12 and the generator 15 through the inverter 16 in accordance with a derived electric motor torque demand value and a derived generator torque demand value. Further, the hybrid ECU 19 is connected to the battery 17 and monitors the charging state, charging current and the like of the battery 17.

The hybrid ECU 19 is connected to the automatic transmission ECU 14a to be able to communicate with each other. The automatic transmission ECU 14a controls gear changes in the power transmission mechanism 14 appropriately in dependence on the shift position from the hybrid ECU 19 and the body speed VB calculated by the brake ECU 26.

Further, the vehicle M is provided with a hydraulic brake device B for braking the vehicle M. The hydraulic brake device B is provided with respective wheel cylinders WCfl, WCfr, WCrl, WCrr, the brake pedal 21 being a brake manipulation member, a vacuum brake booster 22 being a booster device which applies the intake vacuum of the engine 11 to a diaphragm to assist and boost (augment) a brake manipulation force generated by the stepping manipulation of the brake pedal 21, a master cylinder 23 which generates a hydraulic (oil pressure) brake fluid (oil) being a base hydraulic pressure depending on the brake manipulation force (i.e., the manipulation state of the brake pedal 21) boosted by the vacuum brake booster 22 to supply the hydraulic brake fluid to the wheel cylinders WCfl, WCfr, WCrl, WCrr, a reservoir tank 24 which stores brake fluid to replenish the brake fluid to the master cylinder 23, a brake actuator 25, and the brake ECU 26 which controls the brake actuator 25.

The respective wheel cylinders WCfl, WCfr, WCrl, WCrr are for respectively restricting the rotations of the respective wheels Wfl, Wfr, Wrl, Wrr and are provided in respective calipers CLfl, CLfr, CLrl, CLrr. When a base hydraulic pressure and a controlled hydraulic pressure are supplied to the respective wheel cylinders WCfl, WCfr, WCrl, WCrr, respective pistons (not shown) in the respective wheel cylinders WCfl, WCfr, WCrl, WCrr push pairs of brake pads BPfl, BPfr, BPrl, BPrr being friction members and pinch disc rotors DRfl, DRfr, DRrl, DRrr, being rotational members which rotate bodily with the respective wheels Wfl, Wfr, Wrl, Wrr, from opposite sides to restrict the rotations thereof. Although disc type brakes are employed in the present embodiment, there may be employed drum type brakes.

The brake actuator 25 is a device which is provided between the master cylinder 23 and the respective wheel cylinders WCfl, WCfr, WCrl, WCrr and which is capable of applying a controlled hydraulic pressure which is automatically generated regardless of the manipulation or non-manipulation of the brake pedal 21, to the wheel cylinders WCfl, WCfr, WCrl, WCrr so as to generate brake forces on the corresponding wheels Wfl, Wfr, Wrl, Wrr.

The construction of the brake actuator 25 will be described in detail with reference to FIG. 2. The brake actuator 25 is composed of a plurality of systems which are hydraulic circuits operable independently. Specifically, the brake actuator 25 has a first system 25a and a second system 25b in an X-piping fashion. The first system 25a is a system which is in communication with a first hydraulic chamber 23a of the master cylinder 23 and the wheel cylinders WCrl, WCfr of the left rear wheel Wrl and the right front wheel Wfr to serve in controlling the brake forces of the left rear wheel Wrl and the right front wheel Wfr. The second system 25b is a system which is in communication with a second hydraulic chamber 23b of the master cylinder 23 and the wheel cylinders WCfl, WCrr of the left front wheel Wfl and the right rear wheel Wrr to serve in controlling the brake forces of the left front wheel Wfl and the right rear wheel Wrr.

The first system 25a is composed of a differential pressure control valve 41, a left-rear wheel hydraulic pressure control section 42, a right-front wheel hydraulic pressure control section 43 and a first pressure reducing section 44.

The differential pressure control valve 41 is a normally open linear electromagnetic valve which is interposed between the master cylinder 23 and upstream portions of the left-rear wheel hydraulic pressure control section 42 and the right-front wheel hydraulic pressure control section 43. The differential pressure control valve 41 is controllable by the brake ECU 26 to switch between a communication state (non-differential pressure state) and a differential pressure state. When energized to switch to the differential pressure state (closing side), the differential pressure control valve 41 is able to retain the hydraulic pressure on the side of the wheel cylinders WCrl, WCfr at a pressure which is higher by a predetermined controlled differential pressure than the hydraulic pressure on the side of the master cylinder 23. Thus, a controlled hydraulic pressure corresponding to the controlled differential pressure is built up on the condition that pressurization is done by pumps 44a, 54a.

The left-rear wheel hydraulic pressure control section 42 is able to control the hydraulic pressure supplied to the wheel cylinder WCrl and is composed of a pressure increase valve 42a being a normally open electromagnetic shutoff valve which is of a two-port, two-position switchable type, and a pressure reducing valve 42b being a normally closed electromagnetic shutoff valve which is of a two-port, two-position switchable type. The pressure increase valve 42a is interposed between the differential pressure control valve 41 and the wheel cylinder WCrl, while the pressure reducing valve 42b is interposed between the wheel cylinder WCrl and a pressure regulation reservoir 44c, so that the hydraulic pressure in the wheel cylinder WCrl can be increased, retained and reduced in accordance with commands from the brake ECU 26.

The right-front wheel hydraulic pressure control section 43 is able to control the hydraulic pressure supplied to the wheel cylinder WCfr and, like the left-rear wheel hydraulic pressure control section 42, is composed of a pressure increase valve 43a and a pressure deducing valve 43b. When the pressure increase valve 43a and the pressure deducing valve 43b are controlled in accordance with commands from the brake ECU 26, the hydraulic pressure in the wheel cylinder WCfr can be increased, retained and reduced.

The first pressure reducing section 44 is composed of the pump 44a for drawing the brake fluid in the pressure regulation reservoir 44c to supply the brake fluid to between the differential pressure control valve 41 and the pressure increase valves 42a, 43a, a pump motor 44b for driving the pump 44a, and the pressure regulation reservoir 44c for temporarily storing the brake fluids drained from the wheel cylinders WCrl, WCfr through the pressure reducing valves 42b, 43b and for being brought into communication with, or blocked from, the master cylinder 23.

The first pressure reducing section 44 is configured so that with the differential pressure control valve 41 making a differential pressure state and with the pump 44a being driven (e.g., in the case of a side-slip prevention control, a traction control or the like), the brake fluid supplied from the master cylinder 23 can be supplied to the upstream side of the pressure increase valves 42a, 43a by way of the pressure regulation reservoir 44c.

Like the first system 25a, the second system 25b is composed of a differential pressure control valve 51, a left-front wheel hydraulic pressure control section 52, a right-rear wheel hydraulic pressure control section 53 and a second pressure reducing section 54. The left-front wheel hydraulic pressure control section 52 and the right-rear wheel hydraulic pressure control section 53 are able to control the hydraulic pressures supplied to the wheel cylinders WCfl, WCrr, respectively, and like the left-rear wheel hydraulic pressure control section 42 and the right-front wheel hydraulic pressure control section 43, are composed of a pair of a pressure increase valve 52a and a pressure reducing valve 52b and a pair of a pressure increase valve 53a and a pressure reducing valve 53b. Like the first pressure reducing section 44, the second pressure reducing section 54 is composed of a pump 54a, the pump motor 44b (used in common with the first pressure reducing section 44), and a pressure regulation reservoir 54c.

The brake actuator 25 constructed like this brings all of the electromagnetic valves into an unexcited state at the time of an ordinary braking operation and thus, is able to supply a brake hydraulic pressure depending on the manipulation force of the brake pedal 21, that is, a base hydraulic pressure to the wheel cylinders WC. Symbols  stand for suffixes corresponding to either one of the respective wheels and represent either one of fl, fr, rl, rr meaning left-front, right-front, left-rear, and right-rear. This holds throughout the present description and the drawings.

Further, the brake actuator 25 is able to supply brake hydraulic pressures, each being the sum of a base hydraulic pressure from the master cylinder 23 and a controlled hydraulic pressure, respectively to the wheel cylinders WC** when the pump motor 44b, that is, the pumps 44a, 54a are driven together with excitations of the differential pressure control valves 41, 51.

Further, the brake actuator 25 is able to regulate the hydraulic pressures in the wheel cylinders WC** individually by controlling the pressure increase valves 42a, 43a, 52a, 53a and the pressure reducing valves 42b, 43b, 52b, 53b. Thus, in accordance with commands from the brake ECU 26, the brake actuator 25 is able to realize, for example, anti-skid control, front-rear brake force distribution control, side-slip prevention control (specifically, understeer suppression control and oversteer suppression control), traction control, vehicle-to-vehicle distance control and the like which are well-known.

Further, the brake actuator 25 is provided with a pressure sensor 25a1 for detecting a master cylinder pressure being the brake hydraulic pressure in the master cylinder 23, and this detection signal is outputted to the brake ECU 26.

In addition, the hydraulic brake device B is provided with the wheel speed sensors Sfl, Sfr, Srl, Srr for detecting the speeds of the respective wheels Wfl, Wfr, Wrl, Wrr of the vehicle M. The wheel speed sensors Sfl, Sfr, Srl, Srr are provided to be adjacent respectively to the respective wheels Wfl, Wfr, Wrl, Wrr and output to the brake ECU 26 pulse signals (detection signals) of the frequencies that correspond respectively to the rotational speeds of the respective wheels Wfl, Wfr, Wrl, Wrr.

The brake ECU 26 is connected to the hybrid ECU 19 to be able to communicate with each other. In response to a driver's brake demand, that is, a braking manipulation state, the brake ECU 26 outputs to the hybrid ECU 19 a regeneration demand value that the regenerative brake force generation device should undertake of a total brake force (the value corresponding to the brake demand), as a target value to the regenerative brake force generation device, that is, as a target regenerative brake force. Based on the inputted regeneration demand value (target regenerative brake force), the hybrid ECU 19 derives an actual regeneration execution value which is to be applied actually as a regenerative brake, in consideration of the vehicle speed, the battery charging state or the like, controls the drive motor 12 through the inverter 16 to generate a regenerative brake force corresponding to the actual regeneration execution value, and outputs the derived actual regeneration execution value to the brake ECU 26. Thus, the brake ECU 26 performs a regeneration cooperation control in which the total brake force depending on the manipulation state of the brake pedal 21 is composed by combining a frictional brake force (a brake force by the base hydraulic pressure and/or a controlled hydraulic pressure) with a regenerative brake force.

The brake ECU 26 is also as a vehicle body speed calculation device. The brake ECU 26 derives wheel speeds VW based on the detection signals from the wheel speed sensors Sfl, Sfr, Srl, Srr and calculates a first body speed V1 by the use of these wheel speeds VW. On the other hand, the brake ECU 26 derives the rotational speed Vω of the drive motor 12 based on the detection signals of the resolver 12a and calculates a second body speed V2 by the used of the rotational speed Vω. Then, the brake ECU 26 calculates a body speed VB of the vehicle M from the first body speed V1 and the second body speed V2. The brake ECU 26 may be modified to input thereto, in place of the detection signals of the resolver 12a (the signals representing the rotational speed Vω of the drive motor 12), the rotational speed Vω of the drive motor 12 derived from the detection signals and to calculate the second body speed V2 by the use of the rotational speed Vω.

The brake ECU 26 is connected to a speedometer (body speed display) 60 for displaying the body speed and outputs the body speed VB to the speedometer 60. The speedometer 60 is designed to display the body speed VB.

The brake ECU 26 has a microcomputer (not shown), and the microcomputer is provided with an input/output interface, a CPU, a RAM and a ROM (all not shown) which are connected thereto through a bus. By executing programs corresponding to the flow charts shown in FIGS. 3 to 6, the CPU calculates the body speed VB being a body speed for use in controlling the vehicle M, from the first body speed V1 and the second body speed V2, makes the speedometer 60 display the body speed VB and performs brake control, engine control, automatic transmission control by using the body speed VB.

Next, the operation of the vehicle body speed calculation device as constructed above will be described with reference to flow charts shown in FIGS. 3 to 6. When for example, an ignition switch (not shown) of the vehicle is turned to an ON state, the brake ECU 26 executes initialization processing such as memory clearing, flag resetting or the like (step 102), and sets the traveling mode and the on-switching state respectively to a "low speed mode" and an "off-switching" (step 104). Then, the brake ECU 26 executes the processing of steps 106 to 122 at the interval of a predetermined time Ta (e.g., 5 milliseconds). The travelling mode represents the travelling mode of the vehicle and includes the "low speed mode" and a "high speed mode". The on-switching state represents whether or not the vehicle is during the switching between a low speed range and a high speed range in which it is travelling, and includes an "on-switching" and the "off-switching".

Figure 3:
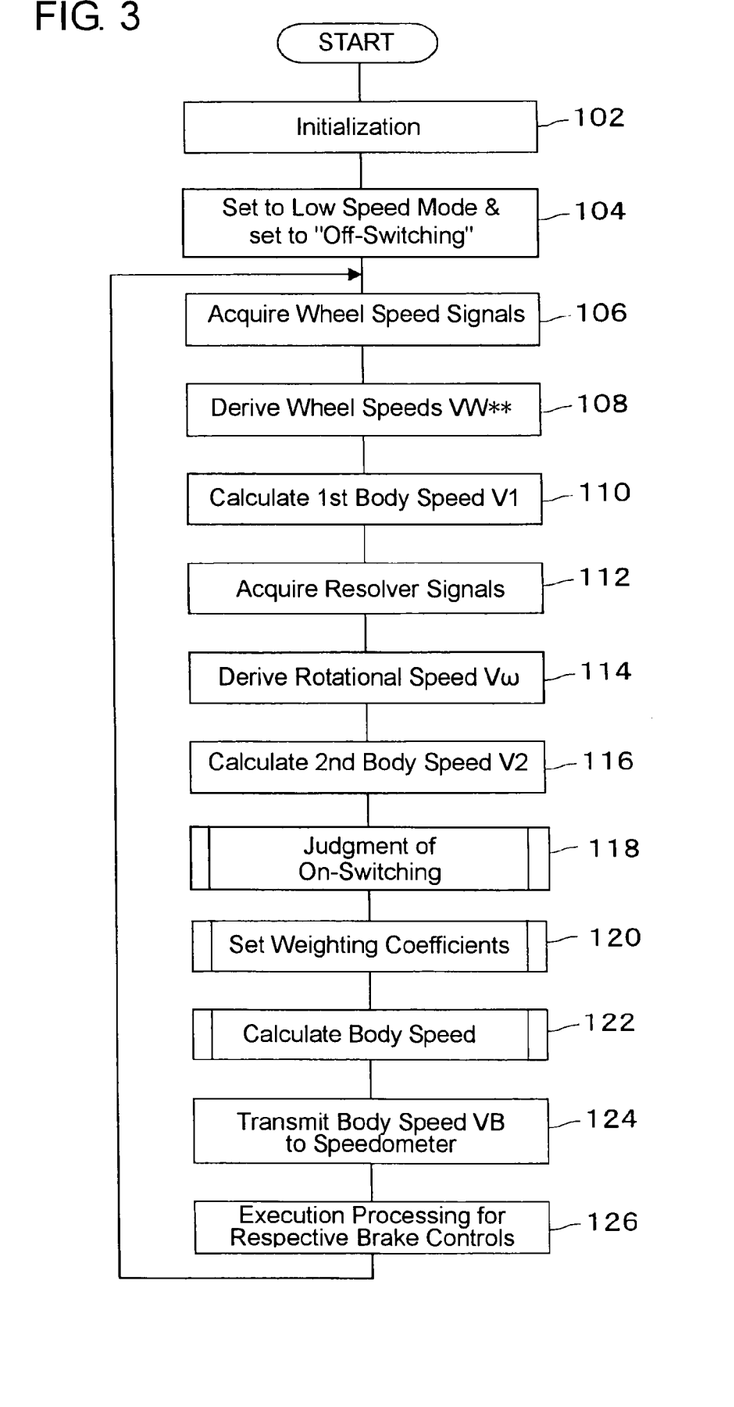
FIG. 3 is a flow chart of a control program executed by a brake ECU shown in FIG. 1.

The brake ECU 26 calculates the first body speed V1 by using the detection signals from the wheel speed sensors Sfl, Sfr, Srl, Srr which detect the speeds of the wheels Wfl, Wfr, Wrl, Wrr of the vehicle M (first body speed calculation means). Specifically, the brake ECU 26 acquires the detection signals from the wheel speed sensors Sfl, Sfr, Srl, Srr (step 106) and derives the wheel speed VW of each of the wheels Wfl, Wfr, Wrl, Wrr ( represents the suffixes corresponding to each wheel and is either one of fl (left-front), fr (right-front), rl (left-rear) and rr (right-rear). The same holds in the following explanation and the drawings) based on the detection signals so acquired (step 108). Then, the brake ECU 26 calculates the first body speed V1 from these derivation results (step 110). In this case, the first body speed V1 may be calculated based on the maximum speed, for example, of the wheel speeds VW of the four wheels or may be calculated by taking an average of the wheel speeds VW of the four wheels.

Processing at the aforementioned steps 106 and 108 serves as wheel speed derivation means. The wheel speed derivation means may be configured to acquire the wheel speeds VW** of the respective wheels Wfl, Wfr, Wrl, Wrr which are given based on the detection signals from the wheel speed sensors Sfl, Sfr, Srl, Srr. This is applicable in the case, for example, that the wheel speed sensors are those which output wheel speeds and hence, that the wheel speeds are acquired from the wheel speed sensors.

The brake ECU 26 calculates the second body speed V2 by using the detection signals (resolver signals) from the resolver (rotational speed detection sensor) 12a which detects the rotational speed Vω of the drive motor 12 (second body speed calculation means). Specifically, the brake ECU 26 acquires the resolver signals from the resolver 12a via the hybrid ECU 19 (step 112) and derives the rotational speed Vω from the resolver signals (step 114). Then, the brake ECU 26 calculates the second body speed V2 from the derivation results. In this case, the second body speed V2 is calculated taking a value such as driving power ratio of the power transmission mechanism 14 into consideration.

Processing at the aforementioned steps 112 and 114 serves as rotational speed derivation means. The rotational speed derivation means may be configured to acquire the rotational speed Vω of the drive motor 12 which is given based on the detection signals of the resolver 12a. This is applicable in the case, for example, that the rotational speed is acquired from the resolver where the same is one which outputs the rotational speed or in the case that another ECU (e.g., the hybrid ECU 19) inputs the detection signals from the resolver 12a and calculates the rotational speed Vω of the drive motor 12 from the detection signals to acquire the calculation result.

Figure 7:
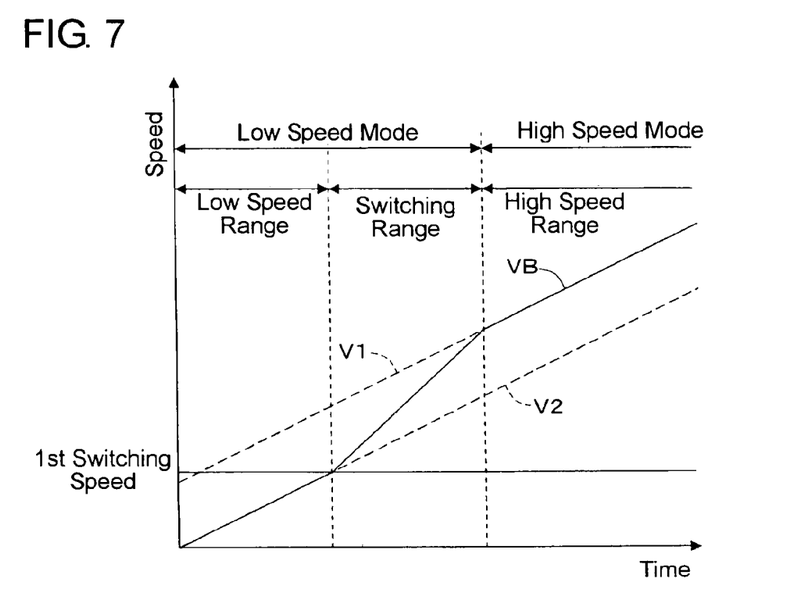
FIG. 7 is a graph for explaining a calculation method of the body speed where the vehicle is being accelerated.

Next, the brake ECU 26 calculates the body speed VB from the aforementioned first and second body speeds V1, V2 in dependence on the acceleration/deceleration state and the traveling speed of the vehicle (step 118-122). First of all, description will be made regarding each of a low speed range, a switching range and a high speed range in the case (refer to FIG. 7) that the vehicle M is at the time of acceleration and that the vehicle M is travelling to proceed from a predetermined low speed range to a predetermined high speed range by way of a switching range. FIG. 7 shows the first and second body speeds V1, V2 by broken lines and the body speed VB by a solid line.

The low speed range (the predetermined low speed range) is a speed range which is lower than a first switching speed (e.g., about 15 km/h) at the time of acceleration. The first switching speed is a speed that prescribes a starting time of the switching range at which the body speed VB is switched from the second body speed V2 to the first body speed V1, and is set to a larger value than a second switching speed being the lowest speed (e.g., about 10 km/h) at which the wheel speed sensors Sfl, Sfr, Srl, Srr are able to detect the wheel speeds precisely. In the low speed range, the body speed VB is the second body speed V2. That is, in the low speed range, the body speed VB can be calculated from the rotational speed Vω of the drive motor 12 which makes it possible to calculate the body speed more precisely than the wheel speed sensors Sfl, Sfr, Srl, Srr do. As mentioned earlier, the switching range is the speed range in which the body speed VB is switched from the second body speed V2 to the first body speed V1. The high speed range (the predetermined high speed range) is a range in which the speed is higher than the speed at a time point when the switching of the body speed VB from the second body speed V2 to the first body speed V1 ends. Further, at the time of acceleration of the vehicle, the "low speed mode" is set in the range which joins the low speed range and the switching range together, while the "high speed mode" is set in the high speed range which has been completely switched from the low speed range.

Firstly, description will be made regarding the case that the vehicle M is travelling in the low speed range at the time of acceleration of the vehicle M. First of all, the brake ECU 26 at step 118 judges whether the on-switching state has been set to the "on-switching" or to the "off-switching". Namely, the brake ECU 26 executes an on-switching judgment routine in accordance with a flow chart shown in FIG. 4.

Figure 4:
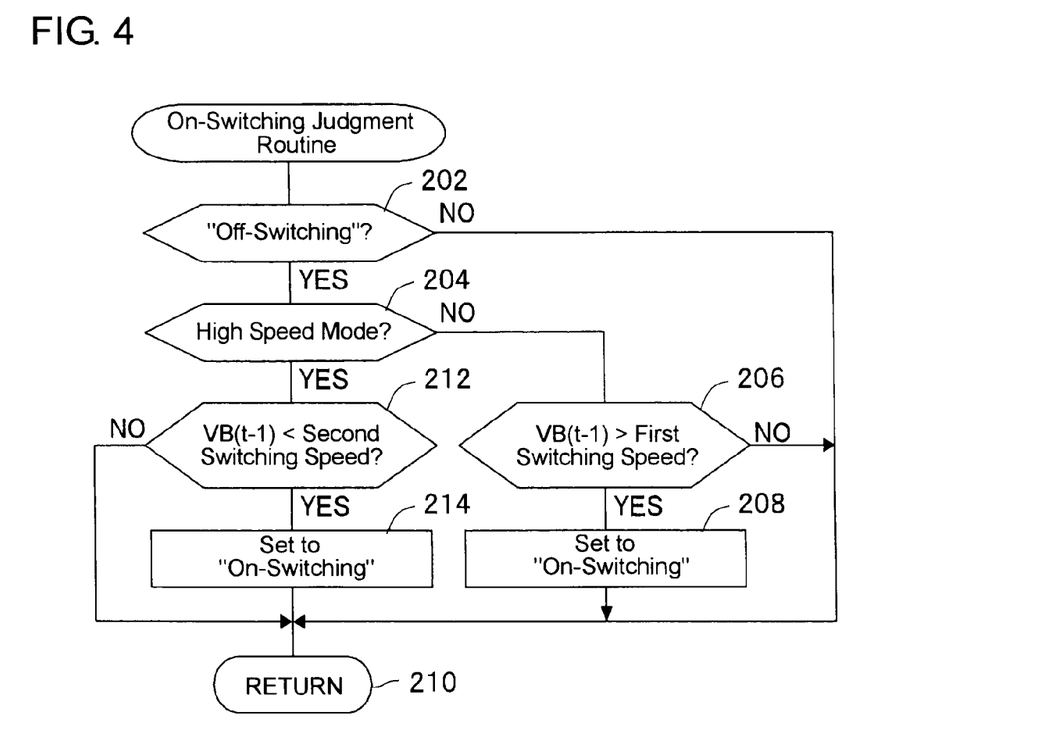
FIG. 4 is a flow chart of an on-switching judgment routine executed by the brake ECU shown in FIG. 1.

In this case, since the on-switching state is the "off-switching" and since the travelling mode is the "low speed mode", the brake ECU 26 makes judgments of "YES" and "NO" respectively at steps 202 and 204. Then, because the last calculated body speed VB(t−1) is equal to or lower than the first switching speed, the brake ECU 26 makes a judgment of "NO" at step 206, whereby the on-switching state is kept to remain in the "off-switching". Subsequently, the program is advanced to step 210 to terminate the present routine temporarily.

Next, in order to calculate the body speed VB with the first and second body speeds V1, V2 being weighted, the brake ECU 26 sets respective weighting coefficients K1 and K2 for the first and second body speeds V1, V2 at step 120 in FIG. 3. Specifically, the brake ECU 26 executes a weighting coefficient setting routine in accordance with a flow chart shown in FIG. 5.

Figure 5:
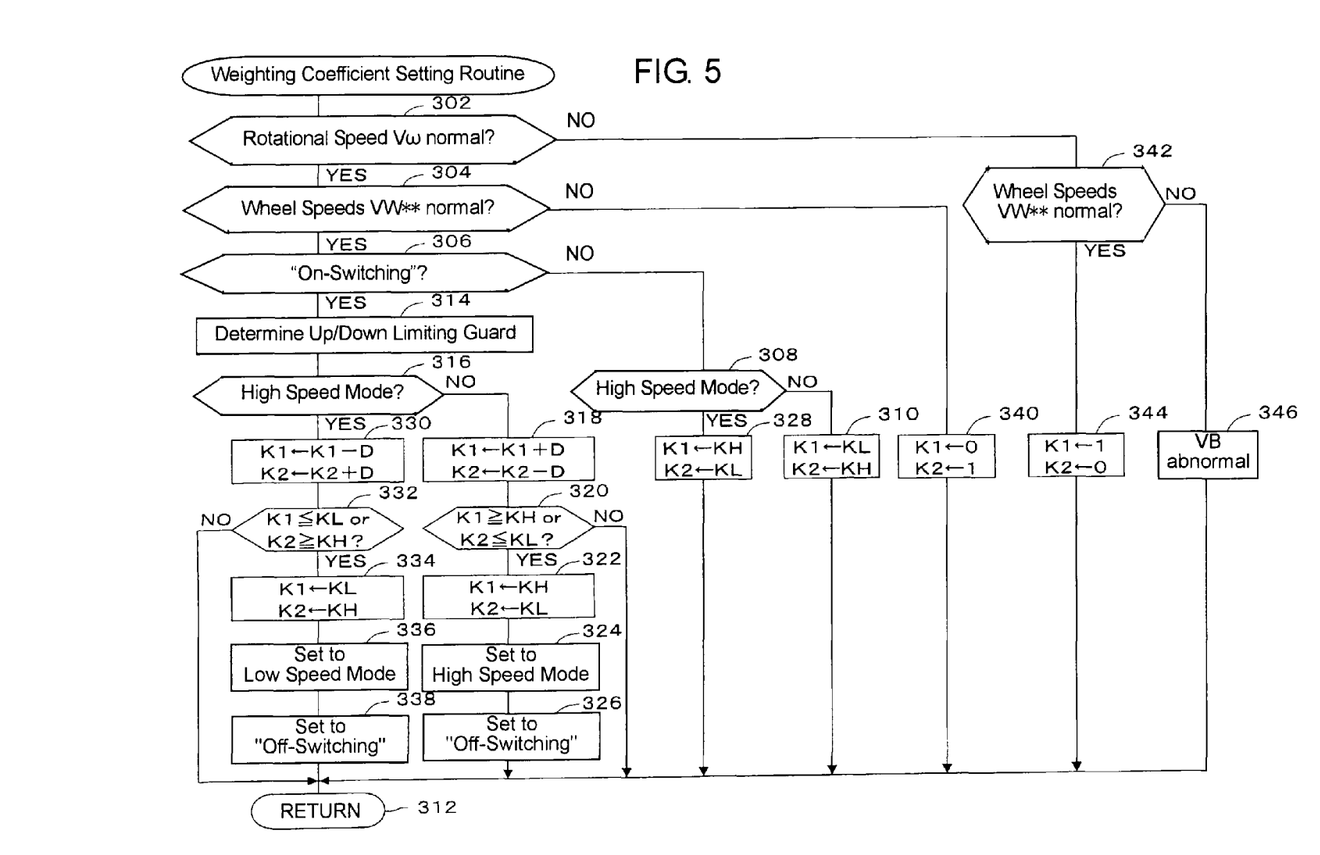
FIG. 5 is a flow chart of a weighting coefficient setting routine executed by the brake ECU shown in FIG. 1.

In this case, by deciding that the rotational speed Vω and the wheel speeds VW** are not abnormal, the brake ECU 26 makes judgments of "YES" respectively at steps 302 and 304. Further, since the on-switching state is the "off-switching" and since the travelling mode is the "low speed mode", the brake ECU 26 makes judgments of "NO" respectively at steps 306 and 308 and sets the respective weighting coefficients K1 and K2 to a minimum value KL and a maximum value KH, that is, to 0 and 1 respectively (step 310). Then, the program is advanced to step 312 to terminate the present routine temporarily.

The brake ECU 26 at step 302 judges whether or not the rotational speed Vω as the calculation result is abnormal. In this case, the judgment is made based on whether the rotational speed Vω of the motor acquired from the hybrid ECU 19 is abnormal or not, whether the detection signals from the resolver 12a are abnormal or not, or whether the resolver 12a is abnormal or not. The brake ECU 26 at step 304 judges whether the wheel speeds VW** as the calculation results are abnormal or not. In this case, the judgment is made based on whether either of the detection signals from the wheel speed sensors Sfl, Sfr, Srl, Srr is abnormal or not, or whether either of the wheel speed sensors Sfl, Sfr, Srl, Srr is abnormal or not.

Further, except where description is made regarding the case that the rotational speed Vω or either of the wheel speeds VW is abnormal, the following description will be made on the assumption that the rotational speed Vω and the wheel speeds VW are normal.

Figure 6:
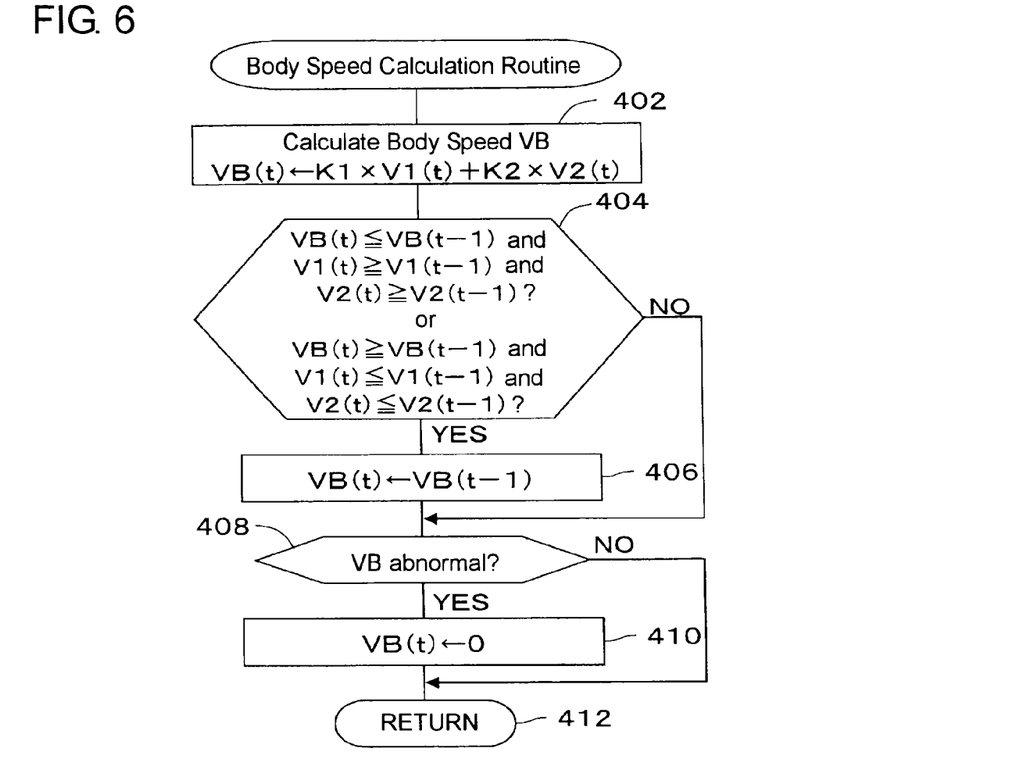
FIG. 6 is a flow chart of a body speed calculation routine executed by the brake ECU shown in FIG. 1.

Then, the brake ECU 26 calculates the body speed VB at step 122 in FIG. 3. That is, the brake ECU 26 executes a body speed calculation routine in accordance with a flow chart shown in FIG. 6. Specifically, the brake ECU 26 at step 402 calculates the present body speed VB(t) from the first body speed V1(t) calculated presently at step 110, the second body speed V2(t) calculated presently at step 116 and the weighting coefficients K1, K2 set at step 120 by using the following expression 1.

$$V3(t)=(K1 \times V1(t)+K2 \times V2(t))/(K1+K2) \quad \text{(Expression 1)}$$

Here, the respective weighting coefficients K1, K2 are set to become K1+K2=1. In this case, since the respective weighting coefficients K1 and K2 are 0 and 1 respectively, the result is V3(t)=V2(t).

Then, the brake ECU 26 judges whether the present body speed VB(t) so calculated is an appropriate value or not. If it is an appropriate value, the brake ECU 26 makes judgments of "NO" at steps 404 and 408, employs the result calculated at step 402, that is, V3(t)=V2(t), and terminates the present routine temporarily at step 412 to advance the program to step 124 in FIG. 3.

Based on the calculation result that the body speed VB(t) is the second body speed V2(t), the brake ECU 26 transmits the body speed VB(t) to the speedometer 60 (step 124) and executes respective brake controls (step 126).

As the brake controls, there are included anti-skid control, front-rear brake force distribution control, side-slip prevention control (specifically, understeer suppression control and oversteer suppression control), traction control, vehicle-to-vehicle distance control and the like. Of these, the anti-skid control and the side-slip prevention control are controls which use the body speed VB. The anti-skid control is of the nature that controls the brake forces of the respective wheels so that the difference between the body speed VB and the wheel speed VW** of each wheel does not become larger than a predetermined value. The side-slip prevention control is of the nature that controls the attitude of the vehicle M by controlling the brake forces or driving powers of predetermined wheels by the use of a yaw rate deviation Δω being the difference between a target yaw rate Tω, which is calculated based on the body speed VB, a steering angle of the vehicle M and a stability factor, and an actual yaw rate Rω which is an actually detected yaw rate of the vehicle M.

When the last calculated body speed VB(t-1) reaches the first switching speed while the vehicle M is travelling in the low speed range, the brake ECU 26 makes a judgment of "YES" at step 206 and sets the on-switching state to the "on-switching" (step 208). That is, the vehicle M travels in the switching range shifted from the low speed range.

Second, description will be made regarding the case that the vehicle M is travelling in the switching range at the time of acceleration of the vehicle M.

In this case, since the vehicle M is travelling in the switching range, the on-switching state is the "on-switching", and the travelling mode is the "low seed mode". Thus, the brake ECU 26 makes a judgment of "NO" at step 202 in FIG. 4. Then, the brake ECU 26 advances the program to step 210 to terminate the present routine temporarily.

Then, by deciding that the rotational speed Vω and the wheel speeds VW are not abnormal, the brake ECU 26 makes judgments "YES" at steps 302 and 304 in FIG. 5. Further, since the on-switching state is the "on-switching", the brake ECU 26 determines an up/down limiting guard D at step 314. Specifically, the up/down limiting guard D indicates the rate of change during the switching between the first body speed V1 and the second body speed V2. The up/down limiting guard D is calculated by using the speed difference ΔV between the first body speed V1 and the second body speed V2 and a map shown in FIG. 9** that represents a relation between the up/down limiting guard D and the speed difference ΔV. Between the up/down limiting guard D and the speed difference ΔV, there is a relation that the up/down limiting guard D is set to a smaller value as the speed difference ΔV increases. This is for the reason that the lower the actual vehicle speed is, the larger the speed difference ΔV caused by detection error becomes and hence that it is necessary to make smaller the rate of change from the first body speed V1 to the second body speed V2 (or from the second body speed V2 to the first body speed V1) by making the up/down limiting guard D smaller.

Further, because of the travelling mode being the "low speed mode", the brake ECU 26 makes a judgment of "NO" at step 316. The brake ECU 26 at step 318 calculates the present weighting coefficient K1 by adding the up/down limiting guard D determined presently at step 314 to a weighting coefficient (the last calculated value) K1 having been presently stored and calculates the present weighting coefficient K2 by subtracting the up/down limiting guard D determined presently at step 314 from a weighting coefficient (the last calculated value) K2 having been presently stored. Thus, after increasing the weighting K1 on the first body speed V1 and decreasing the weighting K2 on the second body speed V2, the switching of the body speed VB from the second body speed V2 to the first body speed V1 is initiated, so that the body speed VB can finally be switched from the second body speed V2 to the first body speed V1.

In this way, during the switching of the body speed VB from the second body speed V2 to the first body speed V1, the brake ECU 26 makes a judgment of "NO" at step 320 until the weighting coefficient K1 calculated at step 318 reaches 1 being the maximum value KH or until the weighting coefficient K2 calculated at step 318 reaches 0 being the minimum value KL, and then, advances the program to step 312 to terminate the present routine temporarily.

Thereafter, at step 402, the brake ECU 26 calculates a present body speed VB(t) from the first body speed V1(t) calculated presently at step 110, the second body speed V2(t) calculated presently at step 116 and the weighting coefficients K1, K2 set at step 120 by using the foregoing expression 1. That is, the result is V3(t)=K1×V1(t)+K2×V2(t).

Then, the brake ECU 26 judges whether the present body speed VB(t) so calculated is an appropriate value or not. If it is an appropriate value, the brake ECU 26 makes judgments of "NO" at steps 404 and 408, employs the result calculated at step 402, that is, V3(t)=K1×V1(t)+K2×V2(t), and terminates the present routine temporarily at step 412 to advance the program to step 124 in FIG. 3. The brake ECU 26 transmits the body speed VB(t) being the calculation result to the speedometer 60 (step 124) and executes the respective brake controls based on the body speed VB(t) (step 126).

During the switching of the body speed VB from the second body speed V2 to the first body speed V1, the brake ECU 26 makes a judgment of "NO" at step 202 in FIG. 4 because of the on-switching state being the "on-switching", as mentioned earlier. When the weighting coefficient K1 calculated at step 318 in FIG. 5 reaches 1 being the maximum value KH or when the weighting coefficient K2 calculated at step 318 reaches 0 being the minimum value KL, the brake ECU 26 makes a judgment of "YES" at step 320 in FIG. 5 and advances the program to step 322 and those subsequent thereto. The brake ECU 26 at step 322 sets the weighting coefficient K1 to 1 being the maximum value KH and sets the weighting coefficient K2 to 0 being the minimum value KL. Thus, the switching of the body speed VB from the second body speed V2 to the first body speed V1 is terminated. Further, the brake ECU 26 at step 324 changes the setting of the travelling mode from the "low speed mode" to the "high speed mode" and at step 326, changes the setting of the on-switching state from the "on-switching" to the "off-switching". Further, since the respective weighting coefficients K1, K2 are 1 and 0, the brake ECU 26 at step 402 in FIG. 6 calculates the present body speed VB(t) as V1(t) by using the foregoing expression 1. In this way, the vehicle M travels in the high speed range.

Thirdly, description will be made regarding the case that the vehicle M is travelling in the high speed range at the time of acceleration of the vehicle M.

In this case, since the on-switching state is the "off-switching" and since the travelling mode is the "high speed mode", the brake ECU 26 makes judgments of "YES" respectively at steps 202 and 204. Then, since the last calculated body speed VB(t−1) is equal to or higher than the second switching speed (e.g., 10 km/h) which is a lower value than the first switching speed, the brake ECU 26 makes a judgment of "NO" at step 212, and the on-switching state is kept to be the "off-switching". Then, the brake ECU 26 advances the program to step 210 to terminate the present routine temporarily.

Further, by deciding that the rotational speed Vω and the wheel speeds VW** are not abnormal, the brake ECU 26 makes judgments of "YES" at steps 302 and 304 shown in FIG. 5. Further, since the on-switching state is the "off-switching" and since the travelling mode is the "high speed mode", the brake ECU 26 makes judgments of "NO" and "YES" respectively at steps 306 and 308 in FIG. 5 and at step 328, sets the weighting coefficient K1 to 1 being the maximum value KH and the weighting coefficient K2 to 0 being the minimum value KL. Then, the program is advanced to step 312 to terminate the present routine temporarily.

Thereafter, at step 402 in FIG. 6, the brake ECU 26 calculates a present body speed VB(t) from the first body speed V1(t) calculated presently at step 110, the second body speed V2(t) calculated presently at step 116 and the weighting coefficients K1, K2 set at step 120 by using the foregoing expression 1. That is, the result is V3(t)=V1(t).

Then, the brake ECU 26 judges whether the present body speed VB(t) so calculated is an appropriate value or not. If it is an appropriate value, the brake ECU 26 makes judgments of "NO" at steps 404 and 408, employs the result calculated at step 402, that is, V3(t)=V1(t), and terminates the present routine temporarily at step 412 to advance the program to step 124 in FIG. 3. The brake ECU 26 transmits the body speed VB(t) being the calculation result to the speedometer 60 (step 124) and executes the respective brake controls based on the body speed VB(t) (step 126).

Figure 8:
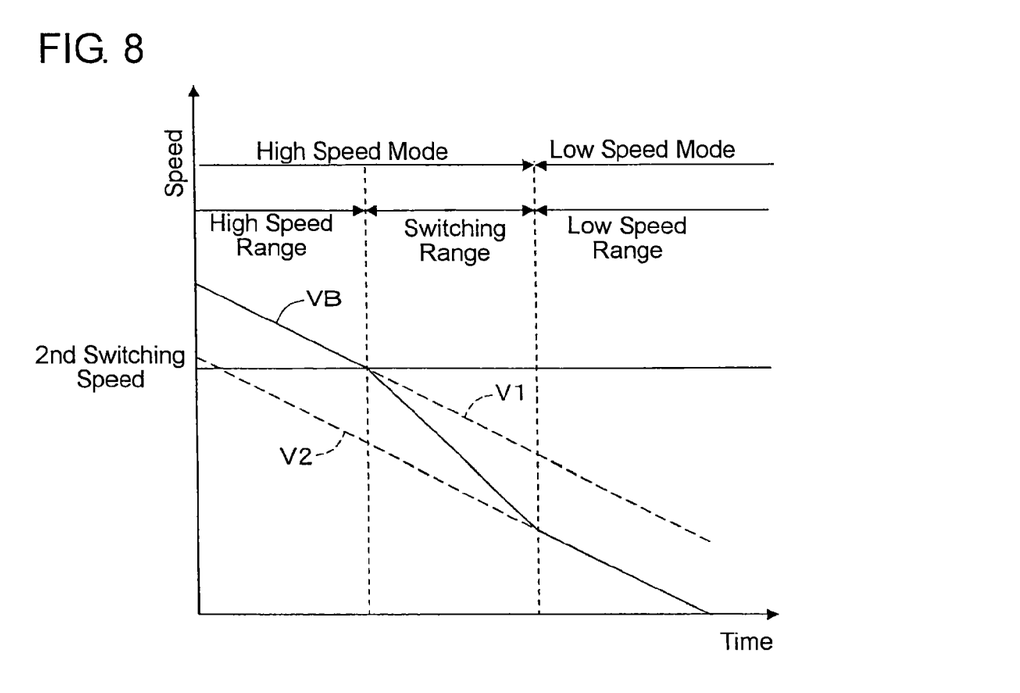
FIG. 8 is a graph for explaining a calculation method of the body speed where the vehicle is being decelerated.

Next, description will be made regarding each of the high speed range, the switching range and the low speed range in the case (refer to FIG. 8) that the vehicle M is at the time of deceleration and that the vehicle M is travelling to proceed from the predetermined high speed range to the predetermined low speed range by way of the switching range. FIG. 8 shows the first and second body speeds V1, V2 by broken lines and the body speed VB by a solid line.

The high speed range (the predetermined high speed range) is a speed range in which the speed is higher than the second switching speed (e.g., about 10 km/h) at the time of deceleration. The second switching speed is a speed that prescribes a starting time of the switching range at which the body speed VB is switched from the first body speed V1 to the second body speed V2. It is preferable that the second switching speed is set to the lowest speed (e.g., about 10 km/h) at which the wheel speed sensors Sfl, Sfr, Srl, Srr are able to detect the wheel speeds precisely. In the high speed range, the body speed VB is the first body speed V1. As mentioned earlier, the switching range is a speed range in which the body speed VB is switched from the first body speed V1 to the second body speed V2. The low speed range (the predetermined low speed range) is a speed range in which the speed is lower than the speed at which the switching of the body speed VB from the first body speed V1 to the second body speed V2 ends. That is, in the low speed range, the body speed VB can be calculated from the rotational speed Vω of the drive motor 12 which makes it possible to calculate the body speed more precisely than the wheel speed sensors Sfl, Sfr, Srl, Srr do. Further, at the time of deceleration of the vehicle, the "high speed mode" is set in the range which joins the high speed range and the switching range together, while the "low speed mode" is set in the low speed range which has been completely switched from the high speed range.

Firstly, description will be made regarding the case where the vehicle M is travelling in the high speed range at the time of deceleration of the vehicle M.

In this case, since the on-switching state is the "off-switching" and since the travelling mode is the "high speed mode", the brake ECU 26 makes judgments of "YES" respectively at steps 202 and 204 shown in FIG. 4. Then, because the last calculated body speed VB(t−1) is equal to or higher than the second switching speed, the brake ECU 26 makes a judgment of "NO" at step 212, and the on-switching state is kept to be the "off-switching". Thereafter, the program is advanced to step 210 to terminate the present routine temporarily.

Then, by deciding that the rotational speed Vω and the wheel speeds VW** are not abnormal, the brake ECU 26 makes judgments of "YES" at steps 302 and 304 shown in FIG. 5. Further, since the on-switching state is the "off-switching" and since the travelling mode is the "high speed mode", the brake ECU 26 makes judgments of "NO" and "YES" respectively at steps 306 and 308 shown in FIG. 5 and at step 328, sets the weighting coefficient K1 to 1 being the maximum value KH and the weighting coefficient K2 to 0 being the minimum value KL. Then, the program is advanced to step 312 to terminate the present routine temporarily.

Thereafter, at step 402 in FIG. 6, the brake ECU 26 calculates a present body speed VB(t) from the first body speed V1(t) calculated presently at step 110, the second body speed V2(t) calculated presently at step 116 and the weighting coefficients K1, K2 set at step 120 by using the foregoing expression 1. That is, the result is V3(t)=V1(t).

Then, the brake ECU 26 judges whether the present body speed VB(t) so calculated is an appropriate value or not. If it is an appropriate value, the brake ECU 26 makes judgments of "NO" at steps 404 and 408, employs the result calculated at step 402, that is, V3(*t*)=V1(*t*), and terminates the present routine temporarily at step 412 to advance the program to step 124 in FIG. 3. The brake ECU 26 transmits the body speed VB(t) being the calculation result to the speedometer 60 (step 124) and executes the respective brake controls based on the body speed VB(t) (step 126).

When the last calculated body speed VB(t−1) reaches the second switching speed (becomes lower than the second switching speed) while the vehicle M is travelling in the high speed range, the brake ECU 26 makes a judgment of "YES" at step 212 and sets the on-switching state to the "on-switching" (step 214). That is, the vehicle M travels in the switching range shifted from the high speed range.

Second, description will be made regarding the case that the vehicle M is travelling in the switching range at the time of deceleration of the vehicle M.

In this case, since the vehicle M is travelling in the switching range, the on-switching state is the "on-switching", and the travelling mode is the "high seed mode". Thus, the brake ECU 26 makes a judgment of "NO" at step 202 shown in FIG. 4. Then, the program is advanced to step 210 to terminate the present routine temporarily.

Then, by deciding that the rotational speed Vω and the wheel speeds VW are not abnormal, the brake ECU 26 makes judgments "YES" at steps 302 and 304 shown in FIG. 5. Further, since the on-switching state is the "on-switching", the brake ECU 26 determines an up/down limiting guard D at step 314**.

Further, because of the travelling mode being the "high speed mode", the brake ECU 26 makes a judgment of "YES" at step 316. The brake ECU 26 at step 330 calculates a present weighting coefficient K1 by subtracting the up/down limiting guard D determined presently at step 314 from a weighting coefficient (the last calculated value) K1 having been presently stored, and calculates a present weighting coefficient K2 by adding the up/down limiting guard D determined presently at step 314 to a weighting coefficient (the last calculated value) K2 having been presently stored. Thus, after decreasing the weighting K1 on the first body speed V1 and increasing the weighting K2 on the second body speed V2, the switching of the body speed VB from the first body speed V1 to the second body speed V2 is initiated, so that the body speed VB can finally be switched from the first body speed V1 to the second body speed V2.

As described above, during the switching of the body speed VB from the first body speed V1 to the second body speed V2, the brake ECU 26 makes a judgment of "NO" at step 332 until the weighting coefficient K1 calculated at step 330 reaches 0 being the minimum value KL or until the weighting coefficient K2 calculated at step 330 reaches 1 being the maximum value KH, and then, advances the program to step 312 to terminate the present routine temporarily.

Thereafter, at step 402, the brake ECU 26 calculates a present body speed VB(t) from the first body speed V1(*t*) calculated presently at step 110, the second body speed V2(*t*) calculated presently at step 116 and the weighting coefficients K1, K2 set at step 120 by using the foregoing expression 1. That is, the result is V3(*t*)=K1×V1(*t*)+K2×V2(*t*).

Then, the brake ECU 26 judges whether the present body speed VB(t) so calculated is an appropriate value or not. If it is an appropriate value, the brake ECU 26 makes judgments of "NO" at steps 404 and 408, employs the result calculated at step 402, that is, V3(*t*)=K1×V1(*t*)+K2×V2(*t*), and terminates the present routine temporarily at step 412 to advance the program to step 124 in FIG. 3. The brake ECU 26 transmits the body speed VB(t) being the calculation result to the speedometer 60 (step 124) and executes the respective brake controls based on the body speed VB(t) (step 126).

During the switching of the body speed VB from the first body speed V1 to the second body speed V2, the brake ECU 26 makes a judgment of "NO" at step 202 in FIG. 4 because of the on-switching state being the "on-switching", as mentioned earlier. When the weighting coefficient K1 calculated at step 330 in FIG. 5 reaches 0 being the minimum value KL or when the weighting coefficient K2 calculated at step 330 reaches 1 being the maximum value KH, the brake ECU 26 makes a judgment of "YES" at step 332 in FIG. 5 and advances the program to step 334 and those subsequent thereto. The brake ECU 26 at step 334 sets the weighting coefficient K1 to 0 being the minimum value KL and sets the weighting coefficient K2 to 1 being the maximum value KH. Thus, the switching of the body speed VB from the first body speed V1 to the second body speed V2 is terminated. Further, the brake ECU 26 at step 336 changes the setting of the travelling mode from the "high speed mode" to the "low speed mode" and at step 338, changes the setting of the on-switching state from the "on-switching" to the "off-switching". Further, since the respective weighting coefficients K1, K2 are 0 and 1, the brake ECU 26 at step 402 in FIG. 6 calculates a present body speed VB(t) as V2(*t*) by using the foregoing expression 1. In this way, the vehicle M travels in the low speed range.

Thirdly, description will be made regarding the case that the vehicle M is travelling in the low speed range at the time of deceleration of the vehicle M.

In this case, since the on-switching state is the "off-switching" and since the travelling mode is the "low speed mode", the brake ECU 26 makes judgments of "YES" and "NO" at steps 202 and 204 shown in FIG. 4. Then, since the last calculated body speed VB(t−1) is equal to or lower than the first switching speed, the brake ECU 26 makes a judgment of "NO" at step 206, and the on-switching state is kept to be the "off-switching". Then, the program is advanced to step 210 to terminate the present routine temporarily.

Further, by deciding that the rotational speed Vω and the wheel speeds VW are not abnormal, the brake ECU 26 makes judgments of "YES" at steps 302 and 304 shown in FIG. 5. Further, since the on-switching state is the "off-switching" and since the travelling mode is the "low speed mode", the brake ECU 26 makes judgments of "NO" respectively at steps 306 and 308 in FIG. 5 and at step 310, sets the weighting coefficient K1 to 0 being the minimum value KL and the weighting coefficient K2 to 1 being the maximum value KH. Then, the program is advanced to step 312** to terminate the present routine temporarily.

Thereafter, at step 402 in FIG. 6, the brake ECU 26 calculates a present body speed VB(t) from the first body speed V1(*t*) calculated presently at step 110, the second body speed V2(*t*) calculated presently at step 116 and the weighting coefficients K1, K2 set at step 120 by using the foregoing expression 1. That is, the result is V3(*t*)=V2(*t*).

Then, the brake ECU 26 judges whether the present body speed VB(t) so calculated is an appropriate value or not. If it is an appropriate value, the brake ECU 26 makes judgments of "NO" at steps 404 and 408, employs the result calculated at step 402, that is, V3(*t*)=V1(*t*), and terminates the present routine temporarily at step 412 to advance the program to step 124 in FIG. 3. The brake ECU 26 transmits the body speed VB(t) being the calculation result to the speedometer 60 (step 124) and executes the respective brake controls based on the body speed VB(t) (step 126).

Further, where either one of the derivation result (i.e., the wheel speeds VW**) by the foregoing wheel speed derivation means (steps 106, 108) and the derivation result (i.e., the rotational speed Vω) by the rotational speed derivation means (steps 112, 114) is normal, the brake ECU 26 calculates the derivation result being normal as the body speed VB(t).

Specifically, where only the derivation result of the rotational speed derivation means is normal, the brake ECU 26 makes judgments of "YES" and "NO" at steps 302 and 304 in FIG. 5 and sets the respective weighting coefficients K1 and K2 to 0 and 1 at step 340. As a result, the brake ECU 26 calculates the body speed VB(t)=the second body speed V2(t) at step 402 in FIG. 6.

Further, where only the derivation result of the wheel speed derivation means is normal, the brake ECU 26 makes judgments of "NO" and "YES" at steps 302 and 342 in FIG. 5 and sets the respective weighting coefficients K1 and K2 to 1 and 0 at step 344. As a result, the brake ECU 26 calculates the body speed VB(t)=the first body speed V1(t) at step 402 in FIG. 6. The processing at step 342 is the same processing as that at the foregoing step 304.

Where the derivation results of the wheel speed derivation means and the rotational speed derivation means are both abnormal, the brake ECU 26 makes judgments of "NO" respectively at steps 302 and 342 in FIG. 5 and sets the body speed VB as being abnormal at step 346.

Further, description will be made regarding the processing in the case that the present body speed VB(t) calculated at step 402 in FIG. 6 is not an appropriate value.

Where the first and second body speeds V1, V2 are both increasing while the vehicle M is travelling in the foregoing switching range and where the presently calculated body speed VB(t) is a smaller value than the last calculated body speed VB(t−1), the brake ECU 26 makes a judgment of "YES" at step 404 and calculates the last calculated body speed VB(t−1) as the presently calculated body speed VB(t) (step 406). Thus, it becomes possible to avoid the situation that the body speed decreases though the vehicle is being accelerated.

On the other hand, where the first and second body speeds V1, V2 are both decreasing while the vehicle M is travelling in the foregoing switching range and where the presently calculated body speed VB(t) is a larger value than the last calculated body speed VB(t−1), the brake ECU 26 makes a judgment of "YES" at step 404 and calculates the last calculated body speed VB(t−1) as the presently calculated body speed VB(t) (step 406). Thus, it becomes possible to avoid the situation that the body speed increases though the vehicle is being decelerated.

Further, where the body speed VB has been set as being abnormal, the brake ECU 26 makes a judgment of "YES" at step 408 and calculates the presently calculated body speed VB(t) as 0 (step 410). In addition to this, it is desirable to issue a warning that the body speed VB(t) is abnormal.

As clear from the foregoing description, in the present embodiment, when the vehicle M is travelling in the predetermined low speed range, the body speed calculation means (brake ECU 26, steps 110, 116-122) calculates the body speed VB by using the rotational speed Vω derived by the rotational speed derivation means (steps 112, 114) which derives the rotational speed Vω based on the detection signals from the resolver (rotational speed detection sensor) 12a which detects the rotational speed Vω of the drive motor 12 connected to the wheels (Wfl, Wfr). On the other hand, when the vehicle M is travelling in the predetermined high speed range which is higher in speed than the predetermined low speed range, the body speed calculation means calculates the body speed by using the wheel speeds VW derived by the wheel speed derivation means (steps 106, 108) which derives the wheel speeds VW based on the detection signals from the wheel speed sensors S which detect the speeds VW of the wheels W of the vehicle M. Thus, it becomes possible to calculate the body speed VB by using the detection signals of the resolver 12a which detects the rotational speed Vω of the drive motor 12 precisely in the low speed range when the vehicle M is travelling in the low speed range, and to calculate the body speed VB by using the detection signals from the wheel speed sensors S which detect the wheel speeds of the wheels W** precisely in the high speed range when the vehicle M is travelling in the high speed range. Accordingly, when the vehicle M is travelling in each of the low speed range and the high speed range, it becomes possible to calculate the body speed precisely in each of the both speed ranges.

Further, when the vehicle M is travelling in the switching range between the predetermined low speed range and the predetermined high speed range, the body speed calculation means (the brake ECU 26) calculates the body speed VB after weighting the first body speed V1 which is calculated (step 110) by using the wheel speeds derived by the wheel speed derivation means and the second body speed V2 which is calculated (step 116) by using the rotational speed derived by the rotational speed derivation means (step 402). Thus, it becomes possible to calculate the body speed precisely even in the switching range, so that it becomes possible to calculate the body speed in all the speed ranges.

Further, in the switching range, the body speed calculation means (the brake ECU 26) performs the switching between the first body speed V1 and the second body speed V2 after changing the weightings on the first and second body speeds V1, V2 (steps 318, 330). Thus, it becomes possible to smoothly perform the switching between the first body speed V1 and the second body speed V2 in the switching range.

Further, the body speed calculation means (the brake ECU 26) provides the up/down limiting guard D against changing the weighting (step 314). Thus, it becomes possible to change the weighting properly.

Figure 9:
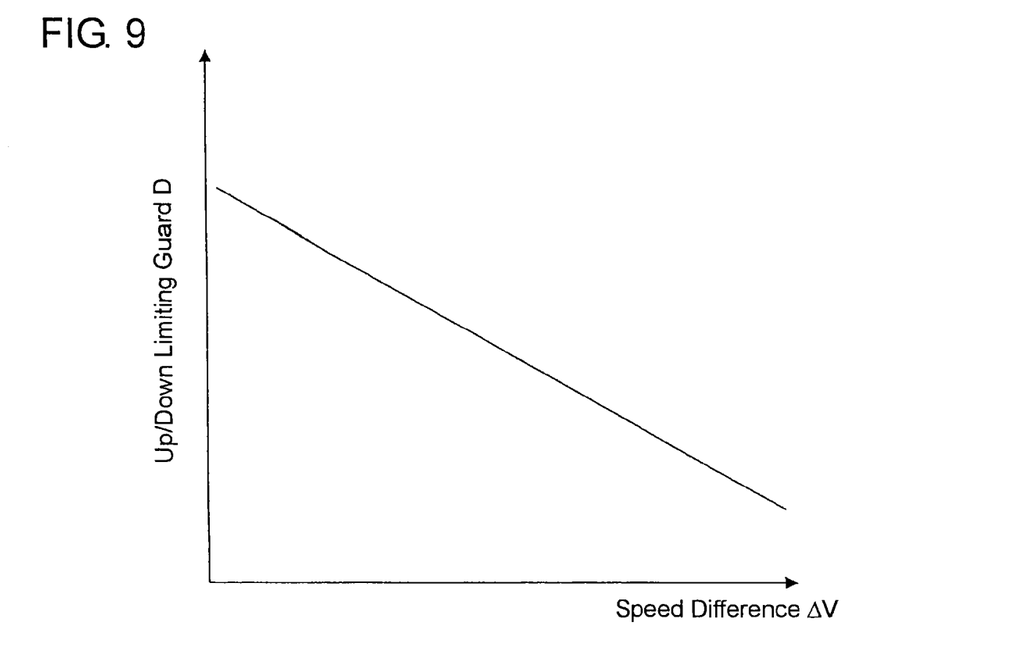
FIG. 9 is a graph showing the relation of the speed difference between first and second body speeds with an up/down limiting guard.

Further, the up/down limiting guard D is varied based on the speed difference ΔV between the first body speed V1 and the second body speed V2 (step 314, FIG. 9). Thus, it becomes possible to changer the weightings in dependence on the speed difference ΔV between the first body speed V1 and the second body speed V2.

Further, in the switching range, the body speed calculation means (the brake ECU 26) calculates the last calculated body speed VB(t−1) as the presently calculated body speed VB(t) (step 406) when the first and second body speeds V1, V2 are increasing and when the presently calculated body speed VB(t) is a smaller value than the last calculated body speed VB(t−1) (step 404) and also calculates the last calculated body speed VB(t−1) as the presently calculated body speed VB(t) when the first and second body speeds V1, V2 are decreasing and when the presently calculated body speed VB(t) is a larger value than the last calculated body speed VB(t−1). Thus, it becomes possible to calculate a body speed which is appropriate to meet the increase/decrease of the body speed.

Further, when either one of the derivation result by the wheel speed derivation means (steps 106, 108) and the derivation result by the rotational speed derivation means (steps 112, 114) is normal (steps 302, 304, 342), the body speed calculation means (the brake ECU 26) calculates the body speed VB by using the derivation result being normal (steps 340, 344). Thus, it becomes possible to calculate an appropriate body speed based on the calculation result being normal.

Further, since in the anti-skid control, the brake forces on the respective wheels are controlled so that the difference between the body speed and the wheel speed of each wheel dose not become larger than a predetermined value, it becomes possible to execute the anti-skid control properly even in the low speed range by using the precise body speed. Further, since in the slid-slip prevention control, the attitude of the vehicle M is controlled in such a way as to control the brake forces and the driving forces to predetermined wheels by using a yaw rage deviation $\Delta\omega$ being the difference between a target yaw rate $T\omega$, which is calculated based on the body speed VB and a steering angle and a stability factor of the vehicle M, and an actual yaw rate $R\omega$ which is an actually detected yaw rate of the vehicle M, it becomes possible to execute the side-slip control properly even in the low speed range by using the precise body speed.

In the foregoing embodiment, the body speed may be calculated based on the detection signals from a resolver which may be provided on the generator 15.

Further, in the foregoing embodiment, the hybrid ECU 19 and the brake ECU 26 may constitute the body speed calculation means where the hybrid ECU 19 derives the rotational speed from the resolver signals.

INDUSTRIAL APPLICABILITY

As described above, a vehicle body speed calculation device according to the present invention is suitable for us in calculating a body speed precisely in all speed ranges.

The invention claimed is:

1. A vehicle body speed calculation device comprising:
a wheel speed derivator to derive wheel speeds based on detection signals from wheel speed sensors which detect the speeds of wheels of a vehicle;
a rotational speed derivator to derive a rotational speed based on a detection signal from a rotational speed detection sensor which detects the rotational speed of an energy conversion device, the energy conversion device being connected to the wheels and being capable of mutual conversion between electric energy and rotational energy; and
a body speed calculator to calculate a body speed by using the rotational speed of the energy conversion device derived by the rotational speed derivator when the vehicle is travelling in a predetermined low speed range and for calculating the body speed by using the wheel speeds derived by the wheel speed derivator when the vehicle is travelling in a predetermined high speed range which is higher in speed than the predetermined low speed range,
wherein, when the vehicle is travelling in a switching range between the predetermined low speed range and the predetermined high speed range, the body speed calculator calculates the body speed after weighting a first body speed calculated by using the wheel speeds derived by the wheel speed derivator and weighting a second body speed calculated by using the rotational speed derived by the rotational speed derivator,
wherein, in the switching range, the body speed calculator performs the switching between the first body speed and the second body speed while changing weightings on the first and second body speeds,
wherein the body speed calculator provides an up/down limiting guard against changing the weightings, and
wherein the up/down limiting guard is varied in dependence on a speed difference between the first body speed and the second body speed.

2. The vehicle body speed calculation device in claim 1, wherein in the switching range, the body speed calculator calculates a last calculated body speed as a presently calculated body speed when the first and second body speeds are increasing and when the presently calculated body speed is a smaller value than the last calculated body speed, and calculates the last calculated body speed as the presently calculated body speed when the first and second body speeds are decreasing and when the presently calculated body speed is a larger value than the last calculated body speed.

3. The vehicle body speed calculation device in claim 1, wherein when either one of a derivation result by the wheel speed derivator or a derivation result by the rotational speed derivator is normal, the body speed calculator calculates the body speed by using the derivation result being normal.

4. The vehicle body speed calculation device in claim 1, wherein the rotational speed detection sensor comprises a resolver which detects the rotational speed of the energy conversion device.

5. The vehicle body speed calculation device in claim 4, wherein the energy conversion device comprises a drive motor connected to the wheels for applying a driving power to the wheels when energized and for generating electricity when rotated by a driving power from the wheels.

6. The vehicle body speed calculation device in claim 1, wherein when the vehicle is travelling in the switching range, the body speed calculator gradually changes weighting the first and second body speeds so that the body speed calculated by the body speed calculator is gradually changed from either one of the first and second body speeds to the other body speed.

* * * * *